United States Patent Office 3,057,731
Patented Oct. 9, 1962

3,057,731
PREPARATION OF BAKERY PRODUCTS
Bengt Gösta Ingemar Fröman, Stuvsta, Sweden, assignor to Skånska Attikfabriken AB, Perstorp, Sweden, a corporation of Sweden
No Drawing. Filed Mar. 23, 1959, Ser. No. 800,927
Claims priority, application Sweden Mar. 27, 1958
2 Claims. (Cl. 99—91)

Among the bacteria having deteriorating effect on bread and other bakery products rope (*Bacillus mesentericus*) usually causes the worst damage. It may, especially during the hot season, cause considerable economic losses for the baker. Rope may infect raw materials or apparatus. The bacteria itself is sensitive to heat and dies during the baking process, but generates during its lifetime spores which survive the baking. When the temperature of the bread after the baking process has diminished sufficiently the spores develop into bacteria for which process a temperature of about 40° C. is most favourable. Once this process has started it continues even at lower temperatures but the rate of growth of the bacteria is highest at 40° C. This is the reason why this bacteria causes the greatest difficulties during the summer when the cooling of the bread usually is slower.

By the effect of the bacteria the bread first acquires a slightly unpleasant odour which progressively becomes more and more unpleasant and the interior of the bread develops into a tough, slimy mass which in serious cases is dark in colour. The tough mass may be drawn out in long threads after cutting the bread which explains the designation "rope" for the effect of this bacteria. Owing to its odour and consistency such bread is unsuitable as human food.

Since the deterioration of the bread is caused by bacteria care should be taken so that infection is prevented. However, if such measures are not sufficient in order to prevent rope, chemical means must be used.

Large quantities of bread are wasted annually owing to attack from different mould types. The most common ones are the Penicillium and Aspergillus types. Another common mould in bread is *Monilia sitophilin* (a mould red in colour and with thermostable spores). Bread made from ryemeal or from a mixture of rye- and wheatmeal is especially susceptible to attack by mould. This is due to the higher content of water and a usually longer storage time of such bread as compared with other types of bread.

It has now been found that according to the invention complex compounds between sodium formate and acetic acid effectively prevent rope in bread when added to the dough in suitable quantities. Moreover, these complex compounds have a more or less pronounced fungicide (mould inhibiting) effect.

It has previously been suggested, for instance in the U.S. Patent No. 2,271,756, to use a water soluble acetate salt containing acetic acid in order to prevent the development of rope and mould in bakery products. Sodium diacetate is said to be especially effective in this connection.

However, research carried out prior to the present invention in order to examine the effects and suitability as rope and mould inhibiting agents in bakery products of complex compounds of formic acid, acetic acid or propionic acid and the sodium, calcium or aluminium salts thereof has shown that only salts according to the present invention, i.e. the complex salts between sodium formate and acetic acid comply with the requirements for a fully satisfactory rope and mould inhibiting agent in bread, namely:

(1) A small percentage of the agent should be effective to prevent the development of rope as well as mould in bread,
(2) The agent should not adversely affect the development of the yeast organisms in the bread,
(3) The agent must not entail any unpleasant odour or taste of the baked product,
(4) The agent should be obtainable as a dry product since the handling of liquid agents is difficult in bakeries.

The examination mentioned above gave as a result the following information. Combinations, or complex compounds, between formates and acetic acid are fully satisfactory with respect to the above requirements. Particularly the complex salt between sodium formate and acetic acid with a general formulation HCOONa.$a$CH$_3$COOH in concentrations of between 0.05–1%, preferably 0.1–1% of the weight of the meal is effective as rope and mould inhibiting means without causing any strange odour or taste in the baked bread and without disturbing the normal development of the yeast micro-organisms. Preferably the factor $a$ in the above formulation shall not exceed 1.

Many combinations between formic acid, acetic acid or propionic acid on the one hand and the sodium, calcium or aluminium salts thereof on the other hand do not crystallize and are thus not obtainable in the form of dry products. Among the complex compounds which crystallize some are not usable because they show a too great toxic effect towards the yeast micro-organisms so that the dough does not raise sufficiently prior to baking. Such complex compounds are for instance the compound between formic acid and sodium acetate, between formic acid and calcium acetate, between acetic acid and calcium acetate, between propionic acid and calcium acetate and between 2 mol acetic acid and sodium acetate. Finally, some of the complex compounds which crystallized and were satisfactory with respect to the rope and mould inhibiting properties and which did not prevent the development of yeast were yet not acceptable owing to their tendency to develop to a more or less extent an unpleasant odour or taste in the baked product. Such complex compounds were for instance that between acetic acid and sodium acetate, between propionic acid and sodium acetate and between propionic acid and sodium propionate.

*Example I*

A baking test with and without the addition of a complex compound of sodium formate and acetic acid with the formulation HCOONa.CH$_3$COOH.

|  | No addition | Addition of HCOONa.CH$_3$COOH | | | |
| --- | --- | --- | --- | --- | --- |
| Addition, percent | — | 0.2 | 0.33 | 0.5 | 0.75 |
| Storage results: | | | | | |
| After 48 hours— | | | | | |
| mould | — | — | — | — | — |
| rope | + | — | — | — | — |
| After 144 hours— | | | | | |
| mould | + | + | + | + | — |
| rope | + | — | — | — | — |
| After 168 hours— | | | | | |
| mould | + | + | + | + | + |
| rope | + | — | — | — | — |

+ = visible growth of rope and mould respectively.
— = no visible growth of rope and mould respectively.

There was no unpleasant taste or odour in the bakery product.

*Example II*

A baking test with and without the addition of a complex compound of sodium formate and acetic acid with the formulation $HCOONa \cdot 0.5CH_3COOH$.

| | No addition | Addition of 0.35% $HCOONa \cdot 0.5CH_3COOH$ |
|---|---|---|
| Bread exposed to air at 35° C: | | |
| 48 hours— | | |
| mould | − | − |
| rope | + | − |
| 72 hours— | | |
| mould | + | − |
| rope | + | − |
| Bread in plastic bags at 35° C: | | |
| 7 days— | | |
| mould | + | + |
| rope | + | ± |

I claim:

1. A method for the preparation of bakery products from a fermented dough which comprises incorporating into the dough, prior to baking, between 0.05% and 1.0%, by weight of the flour, of a complex between sodium formate and acetic acid represented by the formulation $HCOONa \cdot nCH_3COOH$ wherein $n$ does not exceed 1.

2. The method of claim 1 wherein the amount incorporated is between 0.1% and 1.0%.

References Cited in the file of this patent

UNITED STATES PATENTS 2,271,756    Bauer et al.    Feb. 3, 1942

FOREIGN PATENTS 455,846    Great Britain    Oct. 28, 1936

OTHER REFERENCES

Food Industries, February 1942, pp. 47–48.